United States Patent
Lippens et al.

(10) Patent No.: US 6,450,524 B1
(45) Date of Patent: Sep. 17, 2002

(54) APPARATUS FOR POSITIONING STEERABLE WHEELS

(75) Inventors: Christiaan A. C. Lippens, Sint-Laureins (BE); Adrianus Naaktgeboren, Varsenare (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/606,371

(22) Filed: Jun. 29, 2000

(30) Foreign Application Priority Data

Jul. 12, 1999 (GB) .............................. 9916255

(51) Int. Cl.[7] .............................. B62D 13/00
(52) U.S. Cl. .................. 280/445; 280/442; 56/341; 56/432
(58) Field of Search .................. 280/426, 442–445; 56/10.1, 10.5, 341, 432, DIG. 11; 414/111

(56) References Cited

U.S. PATENT DOCUMENTS

| | | | |
|---|---|---|---|
| 3,733,084 A | * 5/1973 | Mauck | 280/445 |
| 4,042,255 A | * 8/1977 | Drewek et al. | 280/445 |
| 4,053,070 A | * 10/1977 | Rozeboom | 414/111 |
| 4,208,063 A | * 6/1980 | Baker et al. | 280/445 |
| 4,219,208 A | * 8/1980 | Fuller et al. | 280/445 |
| 4,307,917 A | * 12/1981 | Hasselbacher et al. | 303/71 |
| 4,703,612 A | * 11/1987 | Webster | 56/11.9 |
| 4,924,667 A | * 5/1990 | Wondergem | 56/341 |
| 5,090,719 A | * 2/1992 | Hanaoka | 280/408 |
| 5,826,953 A | * 10/1998 | Heubner | 303/122.13 |
| 5,894,718 A | * 4/1999 | Hawlas et al. | 56/341 |
| 6,134,870 A | * 10/2000 | Lippens et al. | 56/432 |

* cited by examiner

*Primary Examiner*—Eric Culbreth
*Assistant Examiner*—L. Lum
(74) *Attorney, Agent, or Firm*—John William Stader; Larry W. Miller

(57) ABSTRACT

An agricultural implement, such as a baler comprises a main frame and a hitch for attachment of the implement to a towing vehicle. The frame is supported on a bogie comprising a pair of steerable wheels. A pair of hydraulic rams can block these wheels in a fore-and-aft position for reversing the baler or for preventing fluttering during road transport. Hydraulic circuitry, which is used for controlling functions of said implement, such as the retraction of a bale chute or the operation of a bale eject apparatus can be used to actuate the rams. The rams are loaded by providing pressurized oil to the return line and using a non-return valve for making the oil flow to the guiding the said circuitry to the rams.

8 Claims, 3 Drawing Sheets

APPARATUS FOR POSITIONING STEERABLE WHEELS

BACKGROUND OF INVENTION

1. Field of Art

The present invention relates to pull-type agricultural implements which are conceived for attachment to a pulling vehicle, and more particularly to implements having a pair of steerable wheels.

2. Description of Prior Art

Traditionally, agricultural tractors have been designed for low road speeds, not exceeding 25 km/h. However, more and more modern tractors are capable of attaining top speeds of 50 km/h without discomfort to the user or danger for the tractor structure. In practice however, the speed of the tractor still has to be limited because the implements attached to the tractor do not allow high speeds. This certainly is the case where no suspension is provided for the wheels of the implement.

Accordingly, adequate suspension systems have been fitted to pull-type implements, permitting road speeds in excess of 25 km/h for the whole tractor-implement combination. In one embodiment the implement has been provided with a kind of bogie which is attached by two sets of leaf springs to the frame of the implement. The bogie comprises four wheels mounted to a front and a rear axle. Such structure behaves satisfactorily during road travel, where large turns are to be made, but seriously hampers the operation in the field, where the implement sometimes must take very short turns. The second pair of wheels then seriously hampers the movement of the baler and may even deteriorate the earth on headlands.

In response thereto it has been suggested to make the rear wheels of the implement steerable such that they can adapt freely to the short turns. However, for road travel all wheels have to be held in a fixed position to keep the wheels from fluttering in an uncontrolled movement, especially at high speeds. Moreover, the free movement of the rear wheels may complicate the rearward movement of the implement, as the wheels tend to turn over and deviate the implement to the left or right.

Hence there is a need for means disabling the free movement of the steerable wheels.

SUMMARY OF INVENTION

According to one aspect of the present invention there is provided an agricultural implement, comprising a main frame and a hitch attached to the main frame for attaching the implement to a towing vehicle. There are a pair of steerable wheels supporting the main frame and a means for blocking the steerable wheels in a fore-and-aft direction. The hydraulic circuitry for controlling functions of the implement comprises a feed line and a return line for connection to a hydraulic pump and an oil tank respectively, the connection enabling normal operation of said functions. Finally the circuitry comprises a means for actuating said blocking means by providing hydraulic pressure from said pump to said return line.

According to another aspect of the present invention, there is provided a method for blocking steerable wheels on an agricultural implement. The implement having a main frame, a hitch attached to the main frame for attachment of the implement to a towing vehicle and a pair of steerable wheels supporting the main frame. There is a means for blocking the steerable wheels in a fore-and-aft direction consisting of hydraulic circuitry for controlling functions of the implement. The circuitry comprising a feed line and a return line for connection to a hydraulic pump and an oil tank, respectively. The method comprising the step of actuating said blocking means by providing hydraulic pressure from said pump to said return line.

BRIEF DESCRIPTION OF THE DRAWINGS

An embodiment of the present invention will now be described in further detail, by way of example, with reference to the following drawings.

DETAILED DESCRIPTION OF THE PREFERRED EMBODIMENT

It will be appreciated that the present invention will be described with reference to a rectangular baler, but that the invention is not limited thereto and that it readily can be adapted to other kinds of wheeled agricultural equipment which are adapted for attachment to a towing vehicle.

The terms "front", "rear", "forward", "rearward", "left" and "right" used throughout this description are determined with respect to the normal direction of travel of the machine in operation. However they are not to be construed as limiting terms.

Figure 1:
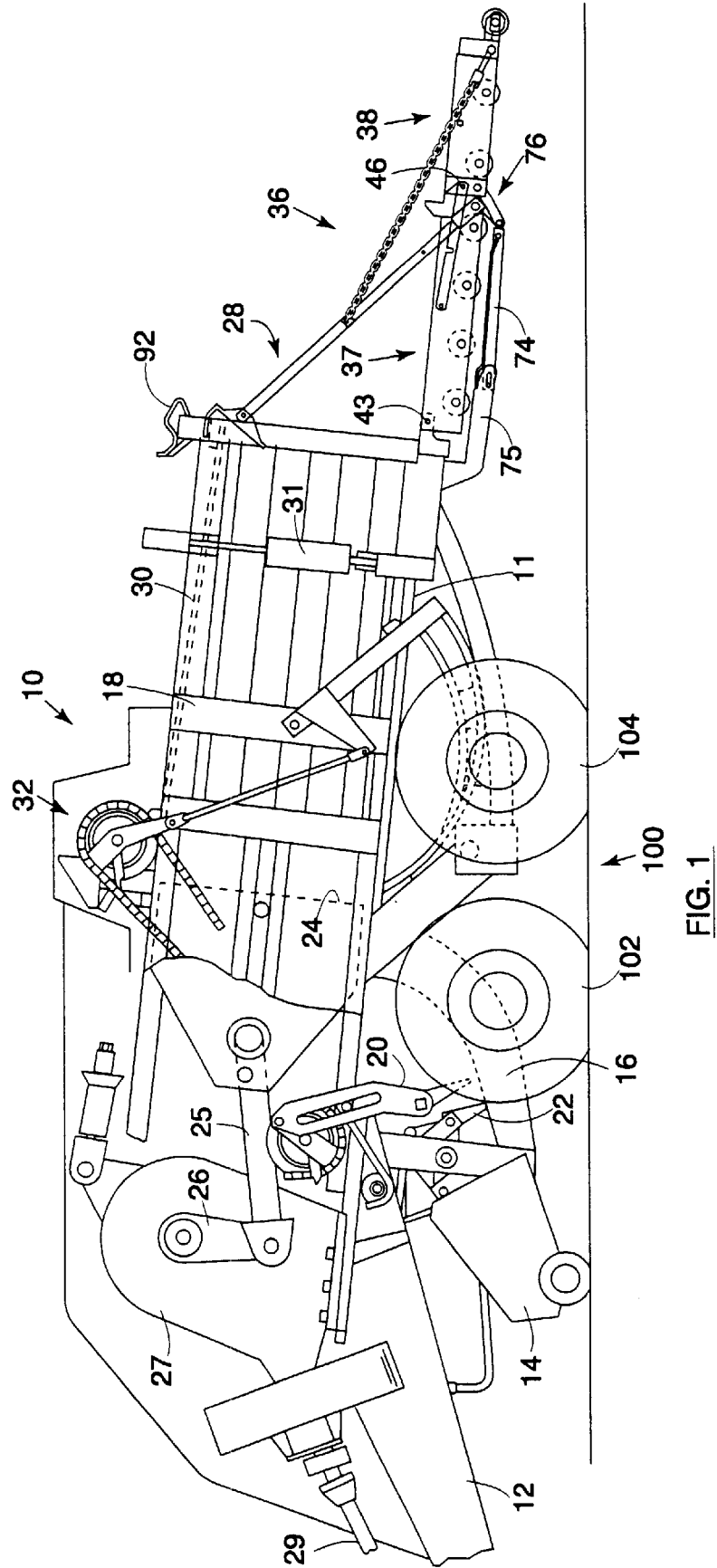
FIG. 1 is a side elevational view of a rectangular baler, having a frame mounted to a bogie having fixed and steerable wheels.

FIG. 1 shows an agricultural baler 10 comprising a frame 11 which is equipped with a forwardly extending tongue 12 provided with hitch means (not shown) at its front end for coupling the baler 10 to a towing vehicle such as an agricultural tractor. A conventional pick-up assembly 14 lifts windrowed crop material off the field as the baler 10 is traveled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. Each action of the stuffer 20 introduces a "charge" or "flake" of crop material from the duct 16 into the chamber 18.

A plunger 24 reciprocates in a fore-and-aft direction within the baling chamber 18 under action of a pair of pitman rods 25 which are linked to the crank arms 26 of a gearbox 27 driven by a shaft 29 which is connected to the PTO shaft of the tractor. The reciprocating plunger 24 pushes each new charge introduced into the baling chamber 18 rearwardly and forms the subsequent charges into a package of crop material, which is pushed by the plunger 24 toward a rearmost discharge aperture 28 of the chamber 18.

The baling chamber 18 comprises at least one movable wall portion 30 of which the position can be adjusted to vary the cross section of the aperture 28. The position of the wall portion 30 is controlled by a pair of actuators in the form of hydraulic cylinders 31 (only one shown in FIG. 1) which are installed between the frame 11 and the wall portion 30. Reduction of the cross section increases the resistance to rearward movement of the crop packages and hence the density of the crop material contained therein. Similarly an increase in cross section will reduce the resistance to the movement and the density of the newly formed packages.

Each package is securely bound in its final compacted form by a tying mechanism 32 before leaving the confines of the baling chamber 18. The length of each bale produced by the baler 10 can be adjustably predetermined by conventional means not shown.

The baler is equipped with bale discharge means 36 in the form of a bale chute, mounted to the rear of the frame 11, adjacent the discharge aperture 28 of the baling chamber 18. The completed bale is received thereon and sustained thereby at least until the rear end of the bale has completely left the confines of the baling chamber 18. The discharge means 36 embrace a front chute portion 37 and a rear chute portion 38. The front portion 37 is attached by a pair of pivot pins 43 to the rear end of the baler frame 11. In turn, the rear portion 38 is mounted via a pair of pivot pins 46 to the rear end of the front chute portion 37.

Figure 5:
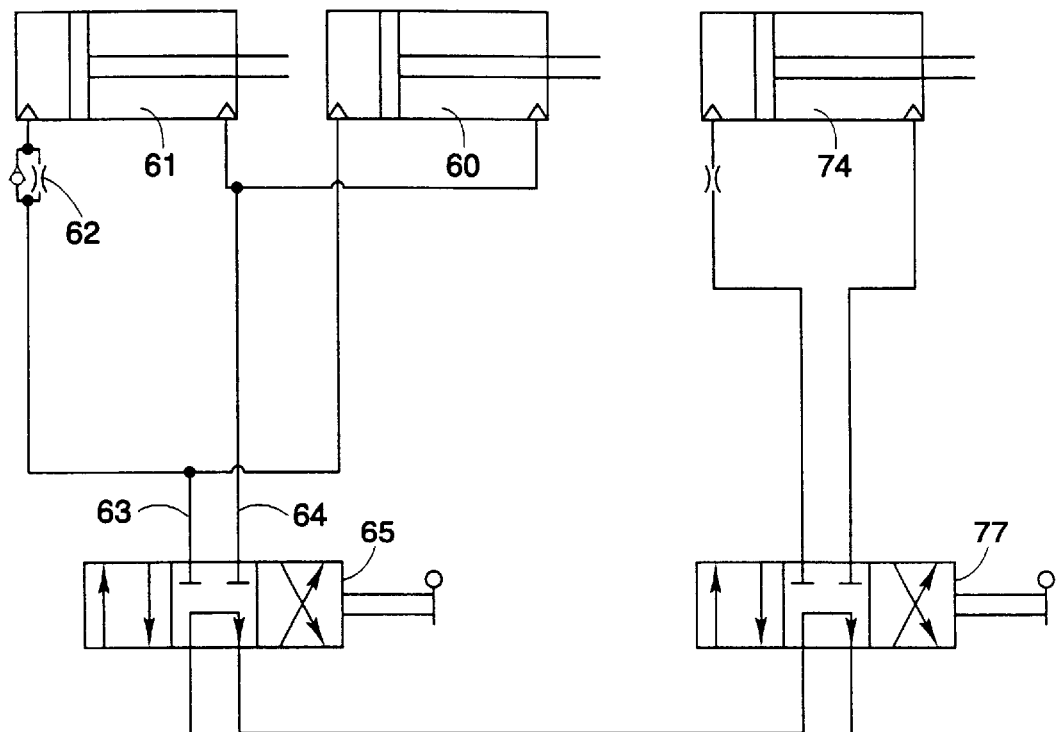
FIG. 5 is a hydraulic scheme, illustrating the operation of the blocking rams.

The bale discharge means 36 can be moved into a transport position by means of a hydraulic cylinder 74, which is mounted below the front chute portion 37, between a support 75 welded to the rear end of the baler frame 11, and a lever arrangement 76, affixed to the front and rear chute portions 36, 37. As shown in FIG. 5, the cylinder 74 is linked via a manually operated valve 77 on the left hand side of the baler frame 11 to hydraulic circuitry 78 of the baler, comprising a pressure line 79 and return line 83, 80. The one line 79 has a pressure connection 81 and the other 80 a return connection 82 for coupling the lines 79, 80 to corresponding lines of the hydraulic circuit of the tractor, comprising a hydraulic pump and an oil tank.

Hydraulic valve 77 can be operated to pivot the rear chute portion 38 upwardly about pivot pins 46 at an angle of 90° to the front chute portion 37 and then to pivot both portions 37, 38 upwardly and forwardly about pivot pins 43 until the rear chute portion rests on a cradle 92 on top of the baling chamber 18.

The baler 10 further is equipped with a system for removing completed bales from the baling chamber 18, even when no fresh crop material is introduced in the front area of the baling chamber to be engaged by the plunger 24. The system comprises a pair of longitudinally arranged slats (not shown) equipped with pivotable tines (equally not shown) which are arranged below the baling chamber 18. A hydraulic double-acting cylinder 60 (FIG. 5) can be actuated to raise the tines into the baling chamber through slots in the bottom wall thereof. In this position the tines are operable to engage the bottom of the bale in the chamber 18. A further double-acting cylinder 61 is operable to reciprocate the slats. Both cylinders 60, 61 are linked to the circuitry 78, wherein an orifice 62 makes cylinder 60 receive priority oil flow when line 63 is pressurized by actuation of a valve 65, which links line 63 to pressure line 79. The cylinders 60, 61 raise the tines and force the slats and tines rearwardly, thereby driving the bale out of the baling chamber 18. In this condition, return oil from both cylinders can flow back to return line 80 via line 64 and valve 65. When the valve 65 is reversed, pressurized oil flows through line 64 to the rod ends of the cylinders 60, 61 to retract the tines and pull the slats forwardly to their home positions. Repeated actuation of the valve 65 drives the bale completely out of the baling chamber 18.

The maximum pressure in the hydraulic circuitry 78 is defined by the pressure relief valve 86, installed between the pressure line 79 and the return line 83.

Figure 3:
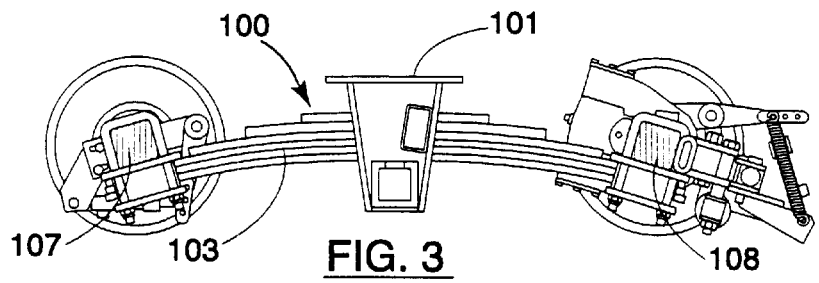
FIG. 3 is a side elevation view of the bogie of FIG. 2.
Figure 2:
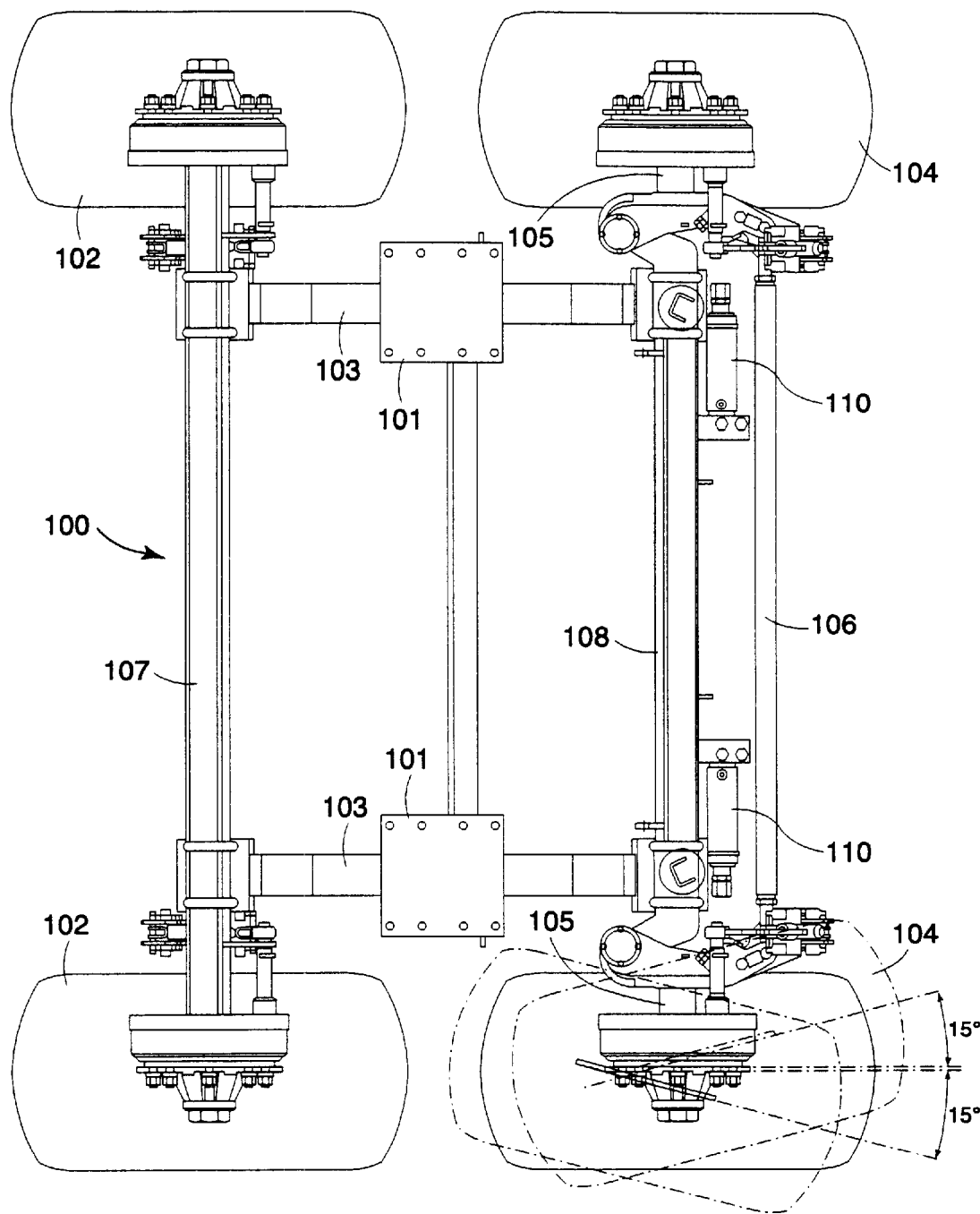
FIG. 2 is a top view of the bogie of FIG. 1, showing a pair of hydraulic rams for blocking the steerable wheels.

The baler frame 11 is mounted to the mounting plates 101 of a bogie 100, shown in FIGS. 2 and 3. The bogie comprises two sets of leaf springs 103, attached to the mounting plates 101, a front axle 107 equipped with two fixed front wheels 102, and a rear axle 108 with two steerable rear wheels 104. The latter are rotatably mounted to the axle 108 by means of king pins 105 which can be pivoted about substantially vertical axes. A connection rod 106 ensures equal and simultaneous movement of the king pins 105. The rear wheels 104 are not actively steered; they adapt freely to the path followed by the towing vehicle and the front wheels 102. As such they allow sharp turns of the baler without "digging" of the rear wheels 104 into the earth.

Figure 4:
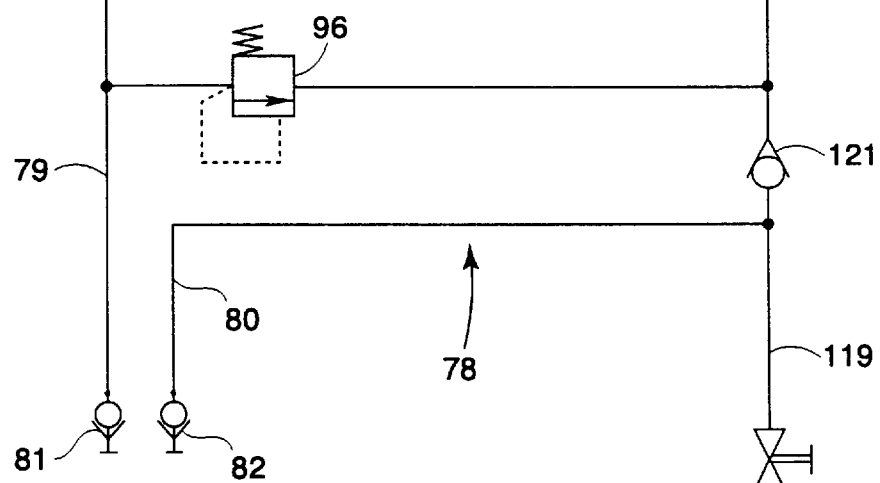
FIG. 4 is a cross sectional view of one of the rams of FIG. 2.
Figure 4:
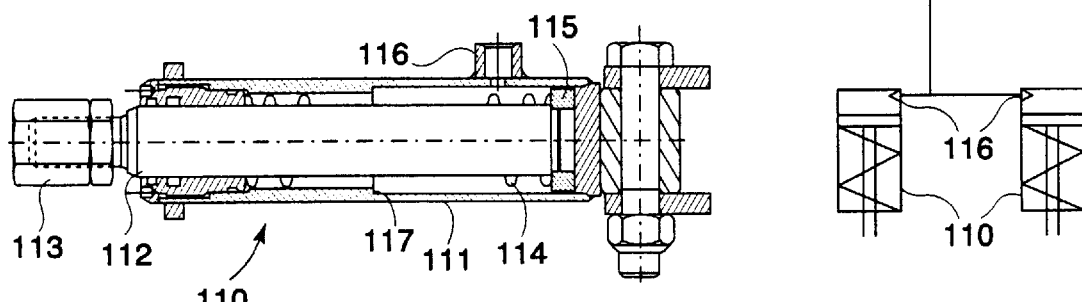

The rear beam 108 of the bogie 100 is provided with two extendable blocking rams 110, shown in further detail in FIG. 4. Each ram has a cylindrical body 111, which is mounted in a transverse direction along the beam 108. The body 111 has a chamber which contains a rod 112 provided with a head 113 directed to the hub of the steerable wheel 104. A spring 114 mounted inside the body 111 exerts an inward force on a foot 115 of the rod 112. A port 116 links the chamber of the ram 108 to a line 119 branched to the return line 80 of the circuitry 78 (FIG. 5).

When no hydraulic pressure is applied to the rams 110, the springs 114 ensure that the heads 113 do not engage the wheels 104, such that they are still free to pivot about the axes of the king pins 105. When pressurized oil is fed to the rams 110, the rods 112 will be urged outwardly against the force of the springs 114. They contact one or other of the rear wheels 104 and force it outwardly to a fore-and-aft direction. The rams 110 pivot the rear wheels until the rod feet 115 contact shoulders 117 inside body 111. In this position, the rear wheels 104 are in alignment with the front wheels 102.

As shown in FIG. 5, both rams 110 are connected via branch line 119 to the return line 80 of the baler circuitry 78. The branch line 119 has a manually controlled shut-off valve 120. During normal operations, the valve 120 is open for permitting remote control of the rams 110. A non-return valve 121 is disposed between the sections 83 and 80 of the return line, permitting free flow of oil from the control valves 65, 77 to the return connection 82.

When the baler 10 is operated in the field, it is not necessary to block the rear wheels 104 of the bogie 100. The valve 120 is opened and the return connection 82 is linked to the return line of the tractor circuitry, draining oil to the oil tank. No pressurized oil is available at the ports 116 and the springs 114 of the rams 110 keep the ram heads 113 in their retracted position, such that the wheels 104 can adapt to the movement of the baler 10. The pressure connection 81 receives pressurized oil from the tractor for possible actuation of the bale eject cylinders 60, 61 or the bale chute cylinder 74.

Free pivotment of the rear wheels 104 is not always desired: e.g. it may be required to block them on order to stabilize the towed baler 10 during road transport. This can be accomplished easily by reversing the direction of the oil flow at connections 81 and 82. By providing pressurized oil at return connection 82, non-return valve 121 is forced to its closed position, thereby cutting line 80 from line 83. Pressure builds up in the chambers of the rams 110 and urges ram heads 113 outwardly. In this manner the wheels 104 are blocked, such that they cannot flutter when the baler 10 is driven at high speeds during road transport. It is also advantageous to block the wheels 104 when driving the baler 10 along a slope or hill-side in order to keep the baler on track behind the tractor. Furthermore, blocking is required when the baler has to be driven rearwardly: otherwise the free rear wheels 104 would turn and deviate the baler 10 to the left or the right.

When one wants to block the wheels 104 during a longer period and/or while no continuous hydraulic pressure is available, the pressurized rams 110 may be held in place by locking the shut-off valve 120.

When the valve 120 is opened, the rams 110 can be retracted immediately by linking the return connection 82 to the return line of the tractor circuitry. The control of the rams 110 can be realized advantageously by having connections 81, 82 linked to hydraulic circuitry comprising a valve of the same type as valves 65 and 77, i.e. with four ports and three positions. Such valve in the tractor circuitry enables immediate switching between a locked and an unlocked condition of the rear wheels 104.

It will be appreciated the invention is not limited to the described embodiment, but readily can be used in other types of pull-type agricultural equipment, such as carts, forage wagons, mowers, etc. It is also envisageable to connect the branch line 119 to the return line of other hydraulic circuitry, e.g. of the system controlling the position of the cylinders 31 for adjustment of the bale density.

It will be obvious to those skilled in the art that various changes may be made without departing from the scope of the invention and the invention is not to be considered limited to what is illustrated in the drawings and described in the specification.

What is claimed is:

1. An agricultural implement that is pulled comprising:
   a main frame having a front end and an opposing rear end;
   a hitch attached to said main frame adjacent said front end thereof for attachment of the implement to a towing vehicle;
   a pair of steerable wheels supporting said main frame and attached thereto toward said rear end thereof; and
   hydraulic circuitry for controlling functions of said implement, said circuitry including a feed line and a return line for connection to a hydraulic pump and an oil tank, respectively, said connection enabling operation of said functions of said implement, the improvement comprising:
   said steerable wheels are each mounted on individual hubs and interconnected such that they are generally parallel to each other at all times;
   a blocking mechanism connected to said circuitry and selectively engagable with at least one of said wheels, and when so engaged, said blocking mechanism pushes said wheels into a generally fixed fore-and-aft position; and
   said circuitry including an actuating mechanism for selectively engaging said blocking mechanism by providing hydraulic pressure from said pump to said return line.

2. The agricultural implement of claim 1, wherein:
   said blocking mechanism includes a hydraulic ram that, when in the engaged position contacts the hub of said at least one wheel and pushes it into a generally fixed fore-and-aft position.

3. The agricultural implement of claim 2, wherein:
   said actuating mechanism further comprises a non-return valve installed in said return line and a branch line connecting said blocking mechanism to said return line between said tank and said non-return valve.

4. The agricultural implement of claim 3, wherein:
   said circuitry further comprises valve means in said branch line for maintaining said blocking mechanism in its actuated position.

5. The agricultural implement of claim 4, wherein:
   said valve mean further includes a manually operated valve to selectively engage said blocking mechanism.

6. The agricultural implement of claim 5, wherein:
   said implement further includes a pair of fixed wheels supporting said main frame, spaced from said steerable wheels toward said front end of said main frame.

7. The agricultural implement of claim 6, wherein:
   said implement is an agricultural baler.

8. The agricultural implement of claim 7, wherein:
   said blocking mechanism includes two hydraulic rams, one engagable with each said steerable wheel.

* * * * *